United States Patent [19]

Grace et al.

[11] Patent Number: 4,826,884

[45] Date of Patent: * May 2, 1989

[54] FLAME RETARDANT POLYURETHANE FOAMS RESISTANT TO CIGARETTE SMOLDERING IGNITION

[75] Inventors: Oscar M. Grace, Troy; Theodore M. Smiecinski, Woodhaven; Steven E. Wujcik, Wyandotte, all of Mich.

[73] Assignee: BASF Corporation, Parsippany, N.J.

[*] Notice: The portion of the term of this patent subsequent to May 17, 2005 has been disclaimed.

[21] Appl. No.: 75,330

[22] Filed: Jul. 20, 1987

[51] Int. Cl.⁴ ............................................. C08G 18/14
[52] U.S. Cl. .................................. 521/128; 521/166; 521/906; 521/137
[58] Field of Search ................ 521/128, 166, 906, 137

[56] References Cited

U.S. PATENT DOCUMENTS

| | | | |
|---|---|---|---|
| 4,221,875 | 9/1980 | Yukuta et al. | 521/128 |
| 4,258,141 | 1/1981 | Jarre et al. | 521/114 |
| 4,293,657 | 10/1981 | Nissen et al. | 521/166 |
| 4,317,889 | 3/1982 | Pclinsky, Jr. | 521/166 |
| 4,427,797 | 1/1984 | Smith | 521/166 |
| 4,644,015 | 2/1987 | Scaccia et al. | 521/128 |

Primary Examiner—Morton Foelak
Attorney, Agent, or Firm—William G. Conger

[57] ABSTRACT

The invention pertains to flame retardant flexible polyurethane foams resistant to cigarette smoldering after being subjected to flex fatigue prepared by reacting a polyether polyol, an organic isocyanate, and a blowing agent incorporating melamine in an amount ranging from about 5 weight percent to about 25 weight percent.

4 Claims, 4 Drawing Sheets

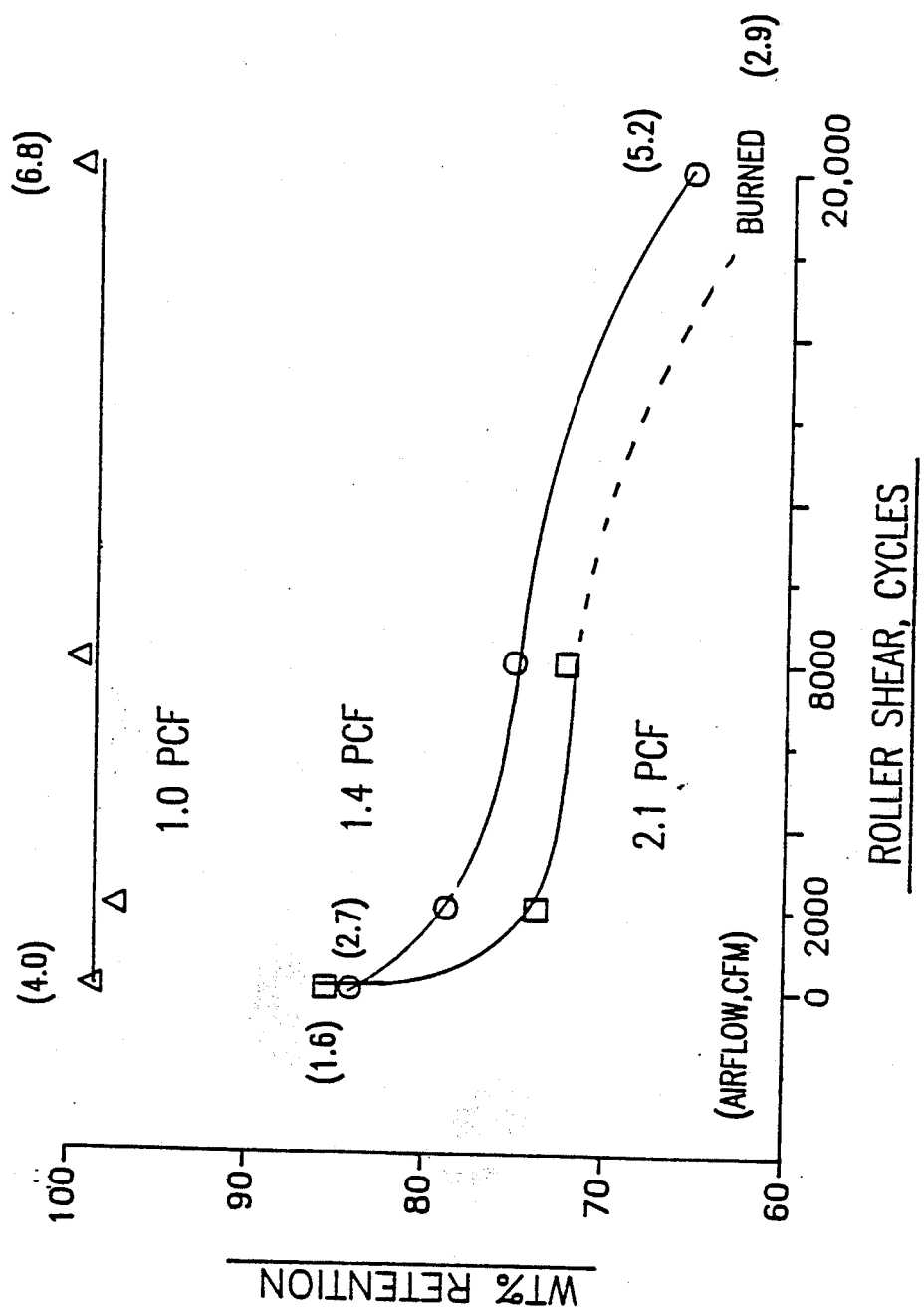
FIGURE I

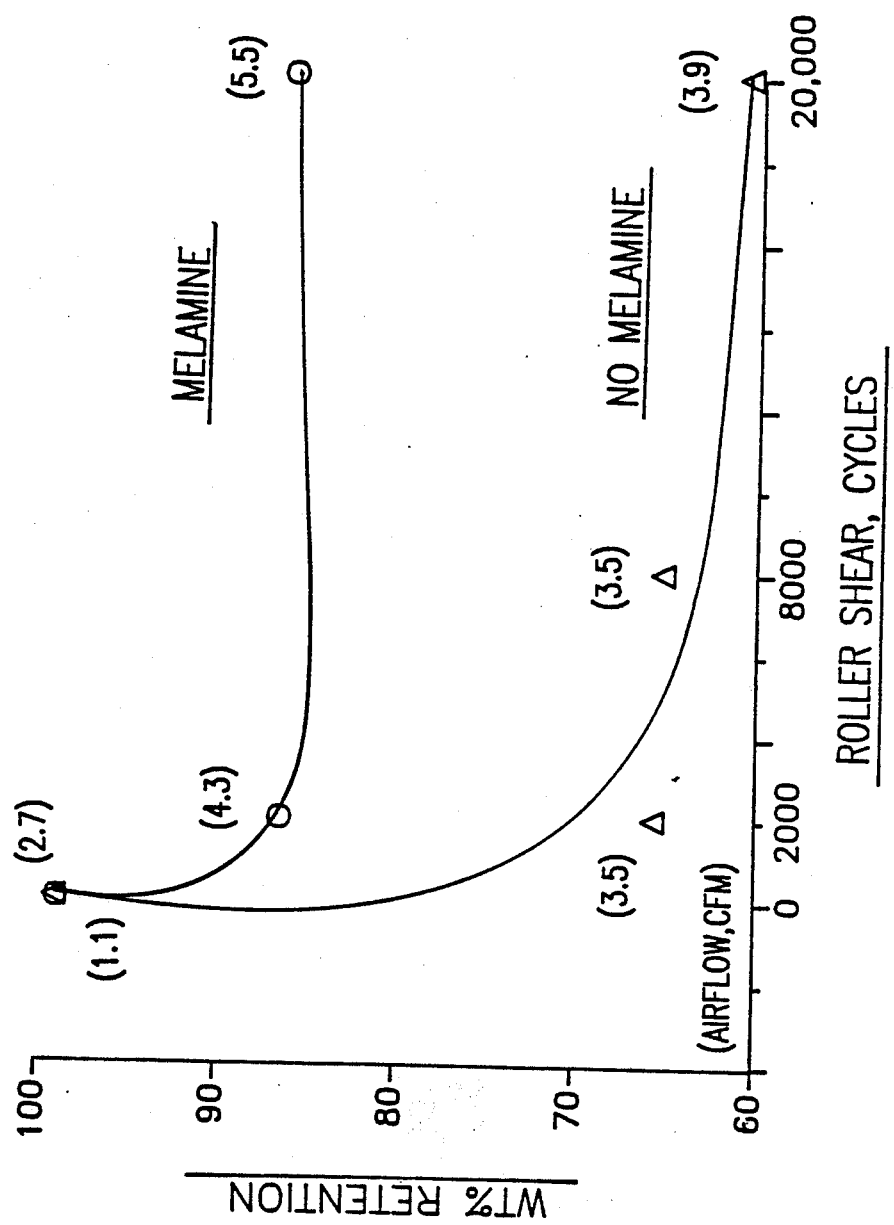
FIGURE II

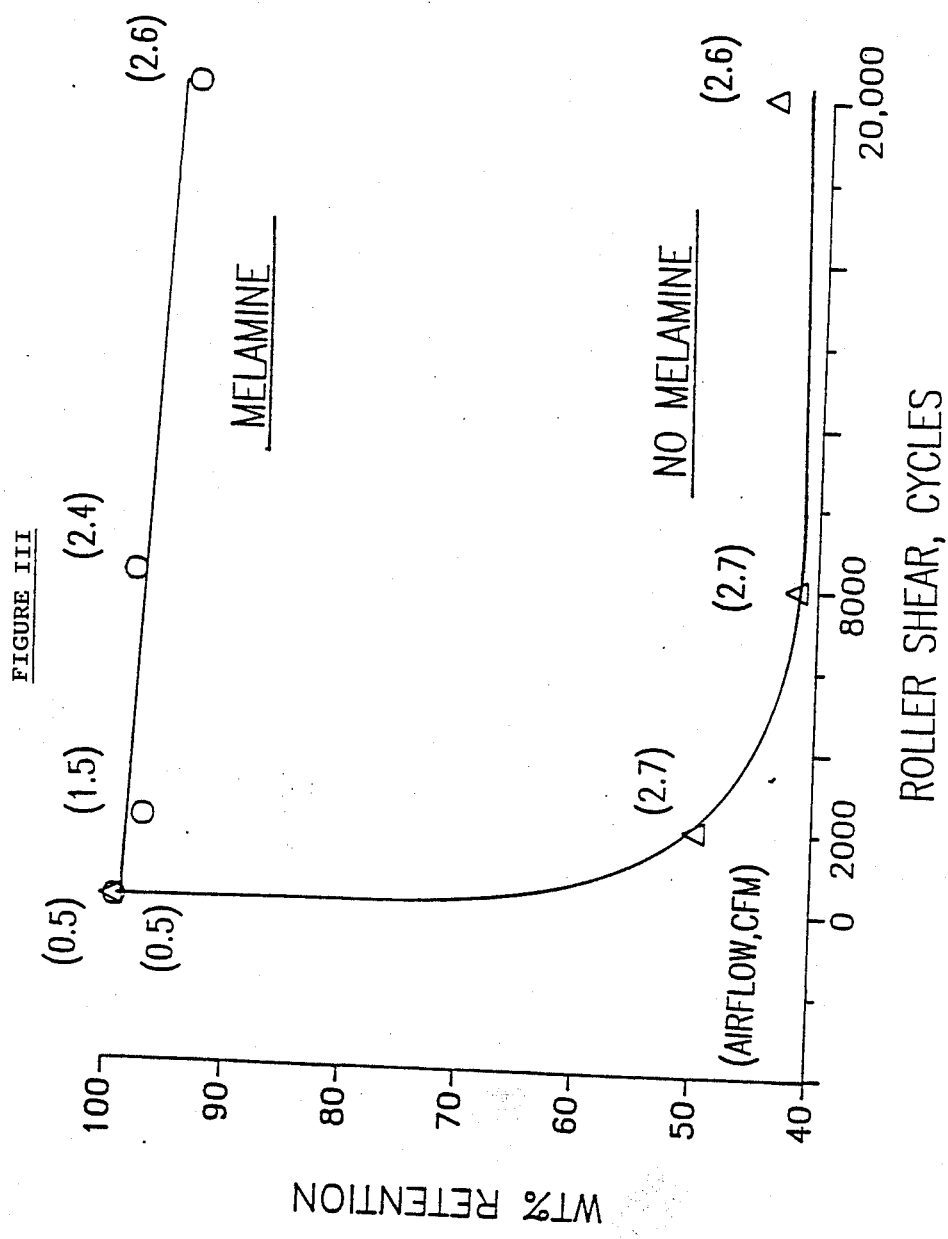

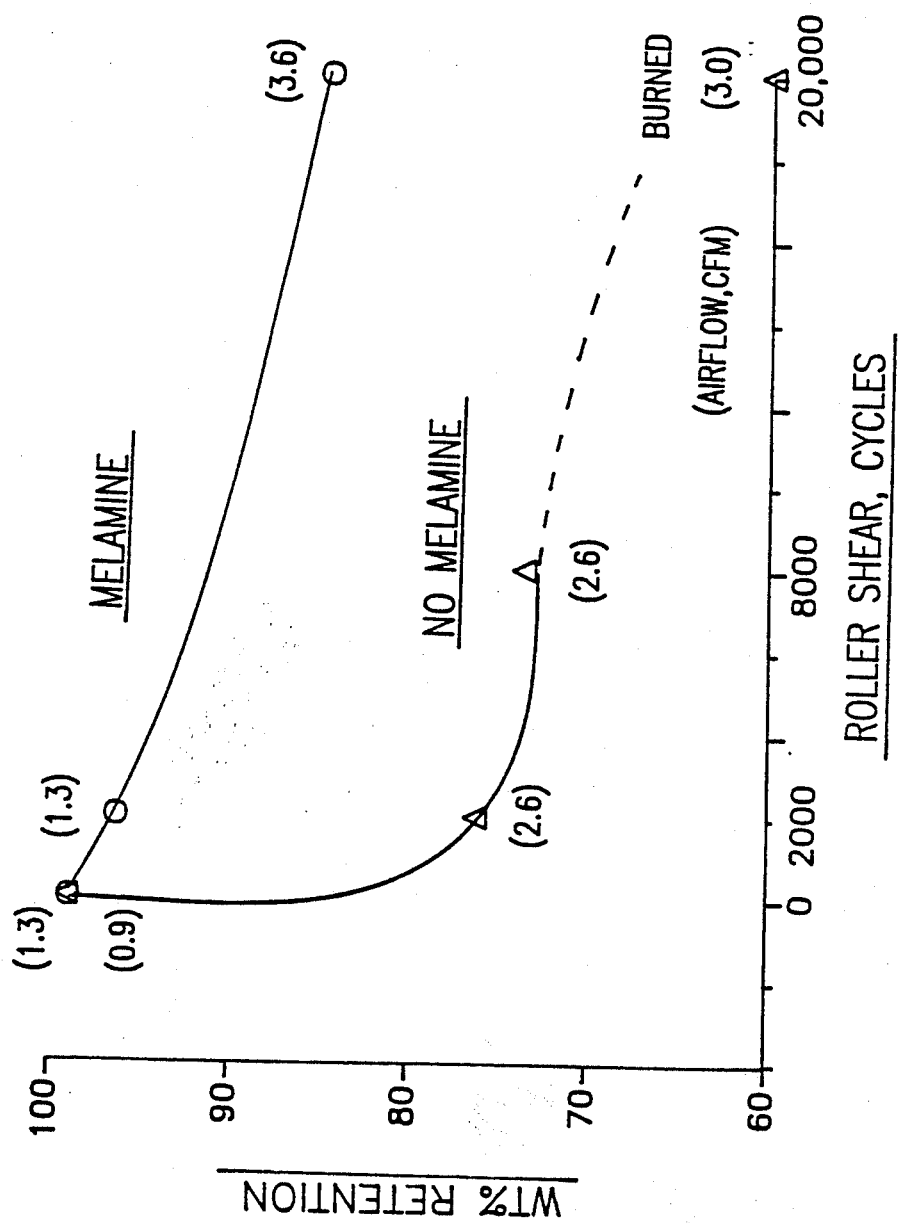
FIGURE IV

FLAME RETARDANT POLYURETHANE FOAMS RESISTANT TO CIGARETTE SMOLDERING IGNITION

BACKGROUND OF THE INVENTION

1. Field of the Invention

The present invention pertains to flexible foam compositions and in particular to flexible polyurethane flame-retarded foam compositions and methods for the preparation thereof. More particularly, the present invention relates to the preparation of flexible polyurethane flame-retarded foam compositions which will retain their resistance to cigarettes smoldering even after service.

2. Description of the Prior Art

The preparation of flexible polyurethane flame-retardant foam compositions are generally well known as evidenced by the following prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retarded, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chloroethyl)-phosphate and an unsubstituted trialkylphosphate such as, for example, triethylphosphate. U.S. Pat. No. 4,221,875 teaches the preparation of rigid polyurethane foam incorporating melamine as the sole flame retardant component. U.S. Pat. No. 4,385,131 teaches the preparation of rebonded polyurethane foam incorporating urea and/or melamine for resistance to smoldering combustion. None of the prior art teaches, however, that incorporating an amount of melamine from about 5 weight percent to about 25 weight percent of the weight of the flexible foam, having a density from about 1.2 lbs/ft$^3$ to about 4 lbs/ft$^3$ will result in a foam resistant to cigarette smoldering upon being subjected to flex fatigue similar to actual servive.

SUMMARY OF THE INVENTION

The present invention applies to both high-resiliency, flexible polyurethane foam compositions and conventional flexible polyurethane foam compositions which retains its cigarette smoldering resistance after service consisting essentially of (a) a polyoxyalkylene polyether polyol, (b) an organic polyisocyanate, (c) a blowing agent, (d) a catalyst, (e) a surfactant, (f) melamine, and (g) optionally chain extenders and flame retardants other then melamine, wherein the concentration of melamine is from about 5 weight percent to about 25 weight percent of the weight of the foam and wherein the density of the foam is from at least 1.2 lbs/ft$^3$ to about 4 lbs/ft$^3$.

For a more complete understanding of the present invention, reference is made to the following detailed description and the examples thereof.

DESCRIPTION OF THE FIGURES

FIG. I illustrates the effect of Roller shear fatigue on cigarette smoldering resistance of polyurethane foam in the absence of melamine at densities of 1.0, 1.4, and 2.1 pcf.

FIG. II illustrates the effect of Roller shear fatigue on cigarette smoldering resistance of polyurethane foam in the absence and presence of 20 pbw melamine at a density of 1.6 pcf.

FIG. III illustrates the effect of Roller shear fatigue on cigarette smoldering resistance of polyurethane foam in the absence and presence of 20 pbw melamine at a density of 2.3 pcf.

FIG. IV illustrates the effect of Roller shear fatigue on cigarette smoldering resistance of polyurethane foam in the absence and presence of 20 pbw melamine at a density of 2.5 pcf.

DESCRIPTION OF THE PREFERRED EMBODIMENTS

It has unexpectedly been found that, in the preparation of flexible flame-retarded polyurethane foam, a mixture of (a) melamine incorporated into the polyoxyalkylene polyether polyol will result in foam which will retain its cigarette smoldering resistance even after being subjected to flex fatigue similar to actual service. It has been found that melamine in the amount ranging from about 5 weight percent to about 25 weight percent of the weight of the foam will enable polyurethane foam to be prepared which will retain its resistance to cigarette smoldering.

Flexible foams are generally defined as having a high tensile to compressive strength ratio (25% deflection) from 15 to 60 or 70 to 1, high elongation, a fast recovery rate and a high elastic limit. Rigid foams on the other hand have a high ratio of compressive to tensive strength, 0.5 to 1 or greater low elongation (less than 10%), a low recovery rate from distortion and a low elastic limit.

Representative polyols which may be employed in the preparation of the flexible flame retardant polyurethane foams are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the polyols will have an equivalent weight from 1000 to 10,000, preferably from 1500 to 3000 and functionality of two to four.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,26-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such s epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymers glycols prepared from blends of two or more alkylene oxides or by the sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 1000 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dehydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The polyols which may be employed in the preparation of the graft polymer dispersions are well known in the art. Both conventional polyols essentially free from ethylenic unsaturation such a those described in U.S. Pat. No. Re. 28,715 and unsaturated polyols such as those described in U.S. Pat. No. 3,652,659 and U.S Pat. No. Re. 29,014 may be employed in preparing the graft polymer dispersions used in the instant invention, the disclosures of which are incorporated by reference. Mixtures of graft polymer dispersions and conventional polyols may be employed.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosued in U.S. Pat. No. Re.

24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofuoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate. Toluene diisocyanate is preferred.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Among the flame retardant compounds in conjunction with melamine which may be employed are tetrakis(2-chloroethyl) ethylene phosphonate, pentabromodiphenyl oxide, tris(1,3-dichloropropyl) phosphate, tris(beta-chloroethyl) phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)-phosphate, and tris(beta-chloropropyl)phosphate.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:

Density—D1622-63
Tensile Strength—D1623-72
Elongation—D412
Split Tear—D470
Compression Set—D395
Compression Load—D1564
Humid Aging—D1564
Dynamic Fatigue Test—D-3574$I_2$ and /D-3574$I_3$
Additional tests included the California Bulletin No. 117 Test, Section D, Part II The following abbreviations are employed in the examples below:

Polyol A is a propylene oxide adduct of trimethylolpropane capped with 15 weight percent ethylene oxide having a hydroxyl number of 25.

Polyol B is a propylene oxide, adduct of glycerine capped with 16.5 weight percent ethylene oxide having a hydroxyl number of 35.

Polyol C is a propylene oxide adduct of trimethylolpropane capped with 13 weight percent ethylene oxide having a hydroxyl number of 35.

Polyol D is a propylene oxide adduct of trimethylolpropane capped with 4.8 weight percent ethylene oxide which is reacted with maleic anhydride and capped with 6 weight percent propylene oxide having a hydroxyl number of 22.

Polyol E is a mixture of Polyol C and Polyol D containing a graft polymer dispersion of 31 weight percent of 1:1 styrene:acrylonitrile having a hydroxyl number of 24.

Polyol F is a propylene oxide, ethylene oxide heteric adduct of glycerine containing 12 weight percent ethylene oxide having a hydroxyl number of 56.

Polyol G is a blend of 49.8 weight percent Polyol B, 38.4 weight percent Polyol E and 11.5 weight percent Polyol C.

Polyol H is a blend of 55 weight percent Polyol A and 45 weight percent Polyol E.

Polyol I is a propylene oxide ethylene oxide heteric adduct of glycerine containing 12.5 weight percent ethylene oxide having a hydroxyl number of 50.0.

Polyol J is a mixture of Polyol D and Polyol I containing a graft polymer dispersion of 40 weight percent of 2:1 styrene:acrylonitrile having a hydroxyl number of 29.0.

DEOA id siethanolamine.

TEOA is triethanolamine.

Silicone 5309 is a silicone surfactant manufactured by Dow Corning Corporation.

T-12 is dibutyltin dilaurate.

Freon 11 is monofluorotrichloromethane.

Dabco 33LV is a 33 percent solution of triethylene diamine in dipropylene glycol.

Niax A-1 is an amine catalyst manufactured by Union Carbide Corporation.

TDI is toluene diisocyanate.

Fyrol FR-2 is tri($\beta,\beta'$-dichloro-isopropyl)phosphate manufactured by Stauffer Chemical Corporation.

Firemaster 836 is 3-bromo-2,2-dimethylpropyl-2-chloroethyl-2-bromoethyl phosphate.

Reactint Blue X-8515 is a polymeric colorant manufactured by Milliken Chemical.

Silicone DC-5043 is a silicone surfactant manufactured by Dow Corning Corporation.

Reactint Red X-26850 is a polymeric colorant manufactured by Milliken Chemical.

Reactint Yellow X-74 is a polymeric colorant manufactured by Milliken Chemical.

Silicone B:3640 is a silicone surfactant manufactured by Goldschmidt AG.

DOP is dioctylphthalate.

PCF is pounds per cubic foot.

CFM is cubic feet per minute.

EXAMPLES 1-41

Examples 1-41 were prepared by employing the following procedure:

The components as indicated in Tables I-VII which were placed into various tanks were metered into a Hennecke UBT foam machine running with a mixer speed of 5000 rpm in the amounts indicated. The mixture was discharged from the mixing head unto a conveyor. The foam expanded to its full height in about three minutes. After a sufficient cure time the foams were submitted for physical property determinations.

TABLE I

| Example | 1 | 2 | 3 | 4 |
|---|---|---|---|---|
| FORMULATIONS | | | | |
| Polyol H | 100.00 | → | → | → |
| T-12 | 0.1 | → | → | → |
| Melamine | — | — | 20.0 | 20.0 |
| Fyrol FR-2 | 5.0 | — | 2.0 | — |
| Reactint Blue X-8515 | 0.05 | — | 0.02 | — |
| Silicone DC-5043 | 1.2 | → | → | → |
| Water | 2.05 | 2.05 | 2.25 | 2.25 |
| DEOA | 0.80 | 0.80 | 1.08 | 1.08 |
| Dabco 33LV | 0.12 | → | → | → |
| Niax A-1 | 0.04 | → | → | → |
| TDI (110 Index) | 28.25 | 28.25 | 31.14 | 31.14 |
| FOAM PROPERTIES | | | | |
| Density, pcf | 2.56 | 2.46 | 2.61 | 2.59 |
| Tensile strength, psi | 23.2 | 21.7 | 15.8 | 16.1 |
| Elongation, % | 190 | 197 | 157 | 153 |
| Tear, pi | 2.4 | 2.3 | 1.9 | 1.7 |
| Resilience, % | 72 | 72 | 70 | 70 |
| ILD, lb/50 sq. in. (4 inch) | | | | |
| 25% | 34.7 | 33.1 | 34.4 | 33.1 |
| 65% | 81.9 | 78.5 | 84.3 | 83.5 |
| Sag Factor | 2.36 | 2.37 | 2.45 | 2.52 |
| Recovery, % | 84.6 | 82.5 | 81.0 | 81.7 |
| Compression sets, % set | | | | |
| 50% | 6.0 | 6.2 | 6.8 | 8.0 |
| 90% | 4.7 | 5.7 | 7.0 | 6.6 |
| Humid aged 5 hrs. at 250° C. | | | | |
| CLD, % of original | | | | |
| 50% | 58.9 | 52.3 | 58.8 | 54.1 |
| Compression Sets, % Set | | | | |
| 50% | 12.0 | 14.4 | 14.8 | 17.3 |
| 90% | 10.8 | 48.6 | 12.4 | 13.5 |
| H.A. Tensile, psi | 25.9 | 17.3 | 13.5 | 10.9 |
| Air flow, cfm | 1.0 | 1.3 | 1.4 | 1.5 |
| Pounding Fatigue, % Loss (4 inch) | | | | |
| Height | 1.3 | 1.2 | 1.7 | 1.5 |
| 40% ILD | 14.0 | 16.5 | 20.8 | 20.6 |
| COMPARISON OF FOAM FLAMMABILITY PROPERTIES | | | | |
| CAL. 117 OPEN FLAME | Pass | Fail | Pass | Pass |
| CAL. 117 SMOLDERING | % Wt. Retained (min. 80.0%) | | | |
| Original | 99.4 | 99.6 | 99.3 | 99.3 |
| Air Flow, cfm | 1.0 | 1.3 | 1.4 | 1.5 |
| Pounding Fatigue | Burned | 61.9 | 98.0 | 99.3 |
| Air Flow, cfm | 1.1 | 1.5 | 1.3 | 1.4 |
| Roller Shear | Burned | 31.1 | 93.6 | 98.6 |
| Air Flow, cfm | 2.3 | 2.7 | 2.5 | 2.7 |

TABLE II

| Example | 5 | 6 | 7 | 8 |
|---|---|---|---|---|
| FORMULATIONS | | | | |
| Polyol H | 100.00 | → | → | → |
| T-12 | 0.1 | → | → | → |
| Melamine | — | — | 20.0 | 20.0 |
| Fyrol FR-2 | 5.0 | — | 2.0 | — |
| Reactint Blue X-8515 | 0.05 | — | 0.02 | — |
| Silicone DC-5043 | 1.2 | → | → | → |
| Water | 2.8 | 2.8 | 3.0 | 3.0 |
| DEOA | 1.09 | 1.09 | 1.37 | 1.37 |
| Dabco 33LV | 0.12 | → | → | → |
| Niax A-1 | 0.04 | → | → | → |
| TDI (110 Index) | 37.02 | 37.02 | 39.91 | 39.91 |
| FOAM PROPERTIES | | | | |
| Density, pcf | 1.88 | 1.81 | 1.99 | 1.98 |
| Tensile strength, psi | 21.4 | 19.8 | 14.6 | 15.5 |
| Elongation, % | 190 | 187 | 153 | 157 |
| Tear, pi | 2.3 | 1.8 | 1.7 | 1.8 |
| Resilience, % | 62 | 65 | 62 | 62 |
| ILD, lb/50 sq. in. (4 inch) | | | | |
| 25% | 31.5 | 26.8 | 30.4 | 28.5 |
| 65% | 69.6 | 61.9 | 72.2 | 68.0 |
| Sag Factor | 2.21 | 2.31 | 2.37 | 2.39 |
| Recovery, % | 75.9 | 77.9 | 75.2 | 74.9 |
| Compression sets, % set | | | | |
| 50% | 6.9 | 7.9 | 10.9 | 11.1 |
| 90% | 7.5 | 6.7 | 69.7 | 73.5 |
| Humid aged 5 hrs. at 250° C. | | | | |
| CLD, % of original | | | | |
| 50% | 72.5 | 71.1 | 77.2 | 79.8 |
| Compression Sets, % Set | | | | |
| 50% | 17.6 | 21.7 | 43.6 | 57.1 |
| 90% | 18.2 | 83.8 | 81.3 | 80.1 |
| H.A. Tensile, psi | 25.5 | 18.6 | 12.9 | 10.9 |
| Air flow, cfm | 1.1 | 1.3 | 1.3 | 1.4 |
| Pounding Fatigue, % Loss (4 inch) | | | | |
| Height | 1.4 | 2.1 | 2.0 | 2.1 |

TABLE II-continued

| Example | 5 | 6 | 7 | 8 |
|---|---|---|---|---|
| 40% ILD | 25.3 | 22.9 | 31.4 | 30.5 |
| COMPARISON OF FOAM FLAMMABILITY PROPERTIES | | | | |
| CAL. 117 OPEN FLAME | Pass | Fail | Pass | Pass |
| CAL. 117 SMOLDERING | % Wt. Retained (min. 80.0%) | | | |
| Original | 99.7 | 99.5 | 99.1 | 99.1 |
| Air Flow, cfm | 1.1 | 1.3 | 1.3 | 1.4 |
| Pounding Fatigue | 64.9 | 79.6 | 98.7 | 99.4 |
| Air Flow, cfm | 1.3 | 1.2 | 1.4 | 1.6 |
| Roller Shear | Burned | Burned | 99.3 | 989.7 |
| Air Flow, cfm | 3.6 | 3.5 | 3.4 | 3.7 |

TABLE III

| Example | 9 | 10 | 11 | 12 |
|---|---|---|---|---|
| FORMULATIONS | | | | |
| Polyol H | 100.00 | → | → | → |
| T-12 | 0.1 | → | → | → |
| Melamine | 10.0 | → | → | → |
| Fyrol FR-2 | 2.0 | — | 2.0 | — |
| Reactrint Blue X-8515 | 0.02 | — | 0.02 | — |
| Silicone DC-5043 | 1.2 | → | → | → |
| Water | 2.15 | 2.15 | 2.9 | 2.9 |
| DEOA | 0.94 | 0.94 | 1.23 | 1.23 |
| Dabco 33LV | 0.12 | → | → | → |
| Niax A-1 | 0.04 | → | → | → |
| TDI (110 Index) | 29.42 | 29.42 | 38.19 | 38.19 |
| FOAM PROPERTIES | | | | |
| Density, pcf | 2.39 | 2.36 | 1.76 | 1.74 |
| Tensile strength, psi | 17.2 | 18.4 | 17.2 | 15.9 |
| Elongation, % | 163 | 187 | 170 | 187 |
| Tear, pi | 2.2 | 2.1 | 2.2 | 2.1 |
| Resilience, % | 68 | 68 | 62 | 62 |
| ILD, lb/50 sq. in. (4 inch) | | | | |
| 25% | 31.5 | 31.1 | 24.9 | 23.3 |
| 65% | 76.6 | 76.0 | 58.5 | 54.9 |
| Sag Factor | 2.43 | 2.45 | 2.35 | 2.36 |
| Recovery, % | 80.7 | 81.1 | 73.2 | 73.6 |
| Compression sets, % set | | | | |
| 50% | 7.9 | 8.2 | 13.3 | 14.2 |
| 90% | 7.8 | 9.1 | 86.2 | 83.1 |
| Humid aged 5 hrs. at 250° C. | | | | |
| CLD, % of original | | | | |
| 50% | 57.4 | 53.1 | 84.3 | 92.1 |
| Compression Sets, % Set | | | | |
| 50% | 18.0 | 20.4 | 61.6 | 72.9 |
| 90% | 19.0 | 38.4 | 89.3 | 90.9 |
| H.A. Tensile, psi | 14.1 | 13.3 | 14.7 | 12.3 |
| Air flow, cfm | 1.3 | 1.2 | 1.1 | 1.3 |
| Pounding Fatigue, % Loss (4 inch) | | | | |
| Height | 1.7 | 1.8 | 3.8 | 1.6 |
| 40% ILD | 22.5 | 25.1 | 32.9 | 21.5 |
| COMPARISON OF FOAM FLAMMABILITY PROPERTIES | | | | |
| CAL. 117 OPEN FLAME | Pass | Fail | Pass | Fail |

TABLE III-continued

| Example | 9 | 10 | 11 | 12 |
|---|---|---|---|---|
| CAL. 117 SMOLDERING | % Wt. Retained (min. 80.0%) | | | |
| Original | 99.1 | 99.3 | 99.6 | 99.3 |
| Air Flow, cfm | 1.3 | 1.2 | 1.1 | 1.3 |
| Pounding Fatigue | 77.8 | 99.5 | 81.6 | 97.9 |
| Air Flow, cfm | 1.3 | 1.3 | 1.3 | 1.3 |
| Roller Shear | 99.3 | 83.9 | 58.6 | 93.7 |
| Air Flow, cfm | 2.5 | 3.2 | 3.4 | 3.4 |

TABLE IV

| Example | | 13 | 14 | 15 |
|---|---|---|---|---|
| FORMULATIONS | STREAM | | | |
| Polyol H | I | 100.0 | 80.0 | 70.0 |
| DEOA | I | 1.2 | 0.96 | 0.84 |
| T-12 | I | 0.15 | 0.12 | 0.105 |
| Reactint Blue X-8515 | I | 0.1 | 0.08 | 0.07 |
| Polyol G | II | — | 20.0 | 30.0 |
| DEOA | II | — | 0.24 | 0.36 |
| T-12 | II | — | 0.03 | 0.045 |
| Reactint Red X-26850 | II | — | 0.01 | 0.015 |
| Melamine | II | — | 20.0 | 30.0 |
| Water | III | 2.8 | 2.8 | 2.8 |
| DABCO 33LV | III | 0.15 | 0.15 | 0.15 |
| NIAX A-1 | III | 0.05 | 0.05 | 0.05 |
| Silicone DC-5043 | IV | 1.2 | 1.2 | 1.2 |
| FYROL FR-2 | V | 6.0 | 3.0 | 3.0 |
| Reactint Yellow X-74 | V | 0.12 | 0.06 | 0.06 |
| TDI (110 Index) | VII | 38.31 | 38.31 | 38.31 |
| FOAM PROPERTIES | | | | |
| Density, pcf | | 2.00 | 2.50 | 2.65 |
| Tensile strength, psi | | 15.7 | 17.7 | 18.4 |
| Elongation, % | | 130 | 163 | 130 |
| Tear, pi | | 1.4 | 1.8 | 1.8 |
| Resilience, % | | 50 | 64 | 60 |
| ILD, lb/50 sq. in. (4 inch) | | | | |
| 25% | | 32.4 | 34.4 | 41.2 |
| 65% | | 76.1 | 85.6 | 104.7 |
| Sag Factor | | 2.35 | 2.49 | 2.54 |
| Recovery, % | | 78.8 | 78.3 | 75.7 |
| Compression sets, % set | | | | |
| 50% | | 12.5 | 9.7 | 9.3 |
| 90% | | 8.4 | 8.2 | 27.6 |
| Air Flow Crushed | | 0.7 | 1.9 | 0.7 |
| POUNDING FATIGUE, % LOSS | | | | |
| Height | | 2.1 | 2.3 | 1.8 |
| 40% ILD | | 25.5 | 29.1 | 28.5 |
| COMPARISON OF FOAM FLAMMABILITY PROPERTIES | | | | |
| CAL. 117 OPEN FLAME | | | | |
| Original | | Pass | Pass | Pass |
| Heat Aged | | Pass | Pass | Pass |
| Smoldering, % Wt. | | | | |
| Original, Retained | | 84.5 | 99.3 | 99.5 |
| Air Flow, Crushed Twice | | 0.7 | 1.9 | 0.7 |
| Fatigue, Retained | | 64.9 | 99.2 | 99.3 |
| Air Flow, Fatigued | | 0.8 | 2.6 | 1.3 |

TABLE V

| Example | | 16 | 17 | 18 | 19 |
|---|---|---|---|---|---|
| FORMULATIONS | STREAM | | | | |
| Polyol H | I | 100.0 | 80.0 | 70.0 | 60.0 |
| DEOA | I | 1.0 | 0.8 | 0.7 | 0.6 |
| T-12 | I | 0.15 | 0.12 | 0.105 | 0.09 |
| Reactint Blue X-8515 | I | 0.1 | 0.08 | 0.07 | 0.06 |
| Polyol G | II | — | 20.0 | 30.0 | 40.0 |
| DEOA | II | — | 0.2 | 0.3 | 0.4 |
| T-12 | II | — | 0.03 | 0.045 | 0.06 |
| Reactint Red X-26850 | II | — | 0.01 | 0.015 | 0.02 |
| Melamine | II | — | 20.0 | 30.0 | 40.0 |
| Water | III | 2.2 | 2.2 | 2.2 | 2.2 |
| DABCO 33LV | III | 0.18 | 0.18 | 0.18 | 0.18 |
| NIAX A-1 | III | 0.06 | 0.06 | 0.06 | 0.06 |
| Silicone DC-5043 | IV | 1.2 | 1.2 | 1.2 | 1.2 |
| FYROL FR-2 | V | 6.0 | 3.0 | 3.0 | 3.0 |

TABLE V-continued

| Example | | 16 | 17 | 18 | 19 |
|---|---|---|---|---|---|
| Reactint Yellow X-74 | V | 0.12 | 0.06 | 0.06 | 0.06 |
| DEOA | VI | — | 0.23 | 0.23 | 0.23 |
| TDI (110 Index) | VII | 31.165 | 31.711 | 31.711 | 31.711 |
| FOAM PROPERTIES | | | | | |
| Density, pcf | | 2.52 | 2.87 | 3.17 | 3.25 |
| Tensile strength, psi | | 14.1 | 16.7 | 16.8 | 16.5 |
| Elongation, % | | 117 | 133 | 127 | 117 |
| Tear, pi | | 1.5 | 1.5 | 1.3 | 1.4 |
| Resilience, % | | 64 | 66 | 62 | 64 |
| ILD, lb/50 sq. in. (4 inch) | | | | | |
| 25% | | 37.1 | 38.4 | 42.2 | 41.2 |
| 65% | | 88.9 | 100.2 | 115.9 | 118.2 |
| Sag Factor | | 2.39 | 2.61 | 2.75 | 2.87 |
| Recovery, % | | 80.3 | 81.3 | 80.6 | 79.6 |
| Compression sets, % set | | | | | |
| 50% | | 10.0 | 6.8 | 9.6 | 9.4 |
| 90% | | 7.2 | 6.3 | 8.3 | 7.5 |
| Air Flow Crushed | | 1.6 | 0.9 | 1.0 | 1.2 |
| POUNDING FATIGUE, % LOSS | | | | | |
| Height | | 1.9 | 2.1 | 0.6 | 2.1 |
| 40% ILD | | 17.0 | 17.7 | 23.7 | 19.9 |
| COMPARISON OF FOAM FLAMMABILITY PROPERTIES | | | | | |
| CAL. 117 OPEN FLAME | | | | | |
| Original | | Pass | Pass | Pass | Pass |
| Heat Aged | | Pass | Pass | Pass | Pass |
| Smoldering, % Wt. | | | | | |
| Original, Retained | | 89.6 | 99.6 | 99.4 | 99.8 |
| Air Flow, Crushed Twice | | 1.6 | 0.9 | 1.0 | 1.2 |
| Fatigue, Retained | | 64.9 | 99.2 | 99.5 | 99.7 |
| Air Flow, Fatigued | | 1.0 | 1.1 | 1.0 | 0.9 |

TABLE VI

| Example | 20 | 21 | 22 | 23 | 24 | 25 | 26 | 27 | 28 | 29 |
|---|---|---|---|---|---|---|---|---|---|---|
| FORMULATION | | | | | | | | | | |
| Polyol F | 100.0 | — | — | — | — | — | — | — | — | — |
| FYROL FR-2 | 12.0 | — | — | — | — | — | 6.0 | — | — | — |
| Melamine | — | — | — | — | — | 15.0 | — | — | — | — |
| Silicone B-3640 | 1.0 | — | — | — | — | — | — | — | — | — |
| T-10/DOP (50/50) | 1.3 | 1.1 | 0.9 | 1.3 | 1.1 | 0.9 | 1.1 | 0.9 | 1.1 | 0.9 |
| Water | 4.7 | 4.7 | 4.7 | 3.2 | 3.2 | 3.2 | 4.7 | 4.7 | 3.2 | 3.2 |
| DABCO 33LV | 0.26 | 0.26 | 0.26 | 0.18 | 0.18 | 0.28 | 0.26 | 0.26 | 0.18 | 0.18 |
| Reactint Red X-26850 | 0.2 | — | — | — | — | — | — | — | — | — |
| TDI (115 Index) | 62.25 | 62.25 | 62.25 | 45.57 | 45.57 | 45.57 | 62.25 | 62.25 | 45.57 | 45.57 |
| Density, pcf | 1.39 | 1.42 | 1.47 | 1.80 | 1.86 | 1.91 | 1.52 | 1.54 | 2.02 | 2.01 |
| FLAMMABILITY PROPERTIES | | | | | | | | | | |
| California 117, Original | | | | | | | | | | |
| Vertical | Pass | Fail | Fail | Pass | Pass | Pass | Fail | Fail | Pass | Pass |
| Smoldering | 99.7 | 85.0 | 71.7 | 99.5 | 99.3 | 78.5 | 97.0 | 82.0 | 99.3 | 80.8 |
| Air flow, cfm | 1.3 | 3.3 | 4.4 | 0.6 | 1.3 | 2.6 | 2.9 | 5.8 | 0.7 | 3.8 |
| FATIGUE, 4000 CYCLES - 30 LBS. | | | | | | | | | | |
| Smoldering | 71.9 | 69.3 | 72.8 | 66.4 | 74.7 | 72.0 | 94.7 | 81.6 | 97.5 | 80.4 |
| Air Flow, cfm | 2.3 | 3.6 | 5.2 | 3.3 | 2.8 | 4.8 | 4.0 | 5.7 | 3.4 | 4.5 |

| Example | 30 | 31 | 32 | 33 | 34 | 35 | 36 | 37 | 38 | 39 |
|---|---|---|---|---|---|---|---|---|---|---|
| FORMULATION | | | | | | | | | | |
| Polyol F | 100.0 | — | — | — | — | — | — | — | — | — |
| FYROL FR-2 | 3.0 | — | — | — | — | — | — | — | — | — |
| Melamine | 20.0 | — | — | — | 25.0 | — | — | — | — | — |
| Silicone B-3640 | 1.0 | — | — | — | — | — | — | — | — | — |
| T-10/DOP (50/50) | 1.1 | 0.9 | 1.1 | 0.9 | 1.3 | 1.1 | 0.9 | 1.3 | 1.1 | 0.9 |
| Water | 4.7 | 4.7 | 3.2 | 3.2 | 4.7 | 4.7 | 3.2 | 3.2 | 3.2 | 3.2 |
| DABCO 33LV | 0.26 | 0.26 | 0.18 | 0.18 | 0.26 | 0.26 | 0.26 | 0.18 | 0.18 | 0.18 |
| Reactint Red X-26850 | 0.2 | — | — | — | — | — | — | — | — | — |
| TDI (115 Index) | 62.25 | 62.25 | 45.57 | 45.57 | 62.25 | 62.25 | 62.25 | 45.57 | 45.57 | 45.57 |
| Density, pcf | 1.53 | 1.56 | 2.02 | 2.03 | 1.49 | 1.498 | 1.48 | 1.91 | 1.98 | 20.1 |
| FLAMMABILITY PROPERTIES | | | | | | | | | | |
| California 117, Original | | | | | | | | | | |
| Vertical | Fail | Fail | Pass | Pass | Fail | Fail | Fail | Fail | Pass | Pass |
| Smoldering | 98.7 | 86.6 | 99.6 | 98.8 | 99.6 | 99.3 | 99.0 | 99.6 | 99.7 | 98.9 |
| Air Flow, cfm | 3.7 | 5.7 | 1.4 | 4.3 | 0.7 | 2.2 | 4.9 | 0.4 | 0.9 | 2.7 |
| FATIGUE, 4000 CYCLES - 30 LBS. | | | | | | | | | | |
| Smoldering | 97.6 | 97.5 | 98.6 | 99.1 | 98.6 | 98.3 | 99.5 | 98.5 | 95.6 | 98.5 |

TABLE VI-continued

| Air Flow, cfm | 3.5 | 5.5 | 3.6 | 4.4 | 1.3 | 4.1 | 2.9 | 1.6 | 4.9 | 3.7 |

TABLE VII

| Example | | 40 | 41 |
|---|---|---|---|
| FORMULATION | STREAM | | |
| Polyol G | I | 100.0 | 90.0 |
| DEOA | I | 1.0 | |
| T-12 | I | 0.15 | 0.135 |
| Reactint Blue X-8515 | I | 0.1 | 0.09 |
| FIREMASTER 836 | I | — | 3.0 |
| Reactint Yellow X-74 | I | — | 0.045 |
| Polyol G | II | — | 10.0 |
| Melamine | II | — | 5.0 |
| DEOA | II | — | 0.1 |
| T-12 | II | — | 0.015 |
| Reactint Red X-26850 | II | — | 0.01 |
| Water | III | 2.0 | 2.3 |
| DABCO 33LV | III | 0.18 | 0.21 |
| NIAX A-1 | III | 0.06 | 0.07 |
| Silicone L-5309 | IV | 1.2 | 1.2 |
| FIREMASTER 836 | V | 6.0 | |
| Reactint Yellow | V | 0.1 | |
| DEOA | V | | 1.035 |
| TDI | VI | 29.25 | 32.44 |
| Index | | 110 | 110 |
| FOAM PROPERTIES | | | |
| Density, pcf | | 2.71 | 2.45 |
| Tensile, psi | | 20.7 | 19.8 |
| Elongation, % | | 147 | 157 |
| Tear, pi | | 1.8 | 2.1 |
| Resilience, % | | 52 | 60 |
| ILD, lb/50 sq. in. (4 inch) | | | |
| 25% | | 35.6 | 35.2 |
| 65% | | 88.6 | 84.4 |
| Sag Factor | | 2.49 | 2.40 |
| Recovery, % | | 84.3 | 79.6 |
| Compression Sets, % | | | |
| 50% | | 9.1 | 10.6 |
| 90% | | 7.8 | 75.2 |
| Humid Aged 5 Hrs. at 250° F. | | | |
| CLD, % of Original 50% | | 54.2 | 47.3 |
| Compression Set, % | | | |
| 50% | | 25.3 | 26.8 |
| 90% | | 79.2 | 58.1 |
| H.A. Tensile Strength, psi | | 20.4 | 17.7 |
| Air Flow, cfm | | 1.0 | 0.9 |
| Pounding Fatigue, % Loss (2 inch) | | | |
| Height | | 0.6 | 0.2 |
| 40% ILD | | 20.5 | 31.6 |
| Flammability Properties | | | |
| California 117 Open Flame | | | |
| Original | | Pass | Pass |
| Heat Aged | | Pass | Pass |
| California 117 Smoldering Spec. Min. 80% | | | |

TABLE VII-continued

| Example | 40 | 41 |
|---|---|---|
| Original | 99.6 | 98.2 |
| Crushed | 61.6 | 95.8 |
| Fatigued | 64.1 | 95.5 |

TABLE VIII

| Example | 42 | 43 | 44 |
|---|---|---|---|
| FORMULATION | | | |
| Polyol A | 100.0 | — | — |
| Polyol I | — | 100.0 | 82.0 |
| Polyol J | — | — | 18.0 |
| Stannous Octoate | 0.37 | 0.24 | 0.11 |
| NIAX A-1 | 0.16 | 0.12 | 0.09 |
| Silicone 5309 | 1.85 | 1.05 | 1.10 |
| Methylene Chloride | 16.5 | 4.5 | 0.70 |
| $H_2O$ | 3.90 | 3.85 | 2.85 |
| FYROL FR-2 | 12.0 | 12.7 | 12.8 |
| TDI | 53.8 | 51.0 | 42.0 |
| Index | 1.2 | 1.1 | 1.2 |
| Physical Properties | | | |
| Density, pcf | 1.0 | 1.4 | 2.1 |
| Air Flow, cfm | 4.0 | 1.6 | 2.7 |

Examples 42–44 are illustrated in FIG. I. The products illustrated in FIGS. II–IV were prepared in a manner similar to those in Examples 1–41.

The embodiments of the invention in which an exclusive privilege or property is claimed are defined as follows:

1. A flame retardant flexible polyurethane foam which retains its cigarette smoldering resistance after service consisting essentially of (a) an acryonitrile/styrene graft polymer polyoxyalkylene polyether polyol dispersion, (b) toluene diisocyanate, (c) a blowing agent, (d) a catalyst, (e) a surfactant, (f) melamine, and (g) optionally chain extenders and flame retardants other than melamine, is melamine at a concentration of from about 5 weight percent to about 25 weight percent of the weight of the foam and wherein the melamine is not crushed in situ in the polyol and wherein the density of the foam is from at least 1.2 lbs/ft$^3$ to about 4 lbs/ft$^3$.

2. The foam of claim 1 wherein the polyol has an equivalent weight from 1000 to 10,000 and a functionality of two to four.

3. The foam of claim 1 wherein the density of the foam is from 1.5 lbs/ft$^3$ to about 4 lbs/ft$^3$.

4. The foam of claim 1 wherein the density of the foam is from 2.0 lbs/ft$^3$ to about 3.5 lbs/ft$^3$.

* * * * *

UNITED STATES PATENT AND TRADEMARK OFFICE
CERTIFICATE OF CORRECTION

PATENT NO. : 4,826,884

DATED : May 2, 1989

INVENTOR(S) : Grace, Oscar M.; Smiecinski, Theodore M.; Wujcik, Steven E.

It is certified that error appears in the above-identified patent and that said Letters Patent is hereby corrected as shown below:

Claim 1 of the patent was printed incorrectly and should read as follows:

1. A flame retardant flexible polyurethane foam which retains its cigarette smoldering resistance after service consisting essentially of (a) an acrylonitrile/styrene graft polymer polyoxyalkylene polyether polyol dispersion, (b) toluene diisocyanate, (c) a blowing agent, (d) a catalyst, (e) a surfactant, (f) melamine, and (g) optionally chain extenders and flame retardants other than melamine, wherein dispersed in the polyether polyol is melamine at a concentration of from about 5 weight percent to about 25 weight percent of the weight of the foam and wherein the density of the foam is from at least 1.2 lbs/ft$^3$ to about 4 lbs/ft$^3$.

Signed and Sealed this

Twenty-sixth Day of June, 1990

Attest:

HARRY F. MANBECK, JR.

*Attesting Officer*   *Commissioner of Patents and Trademarks*